No. 803,821. PATENTED NOV. 7, 1905.
H. GRIMES.
SNOW PLOW.
APPLICATION FILED APR. 28, 1905.
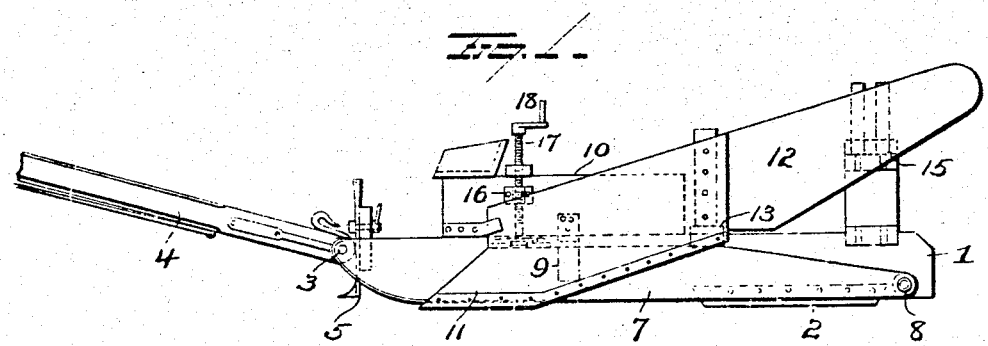
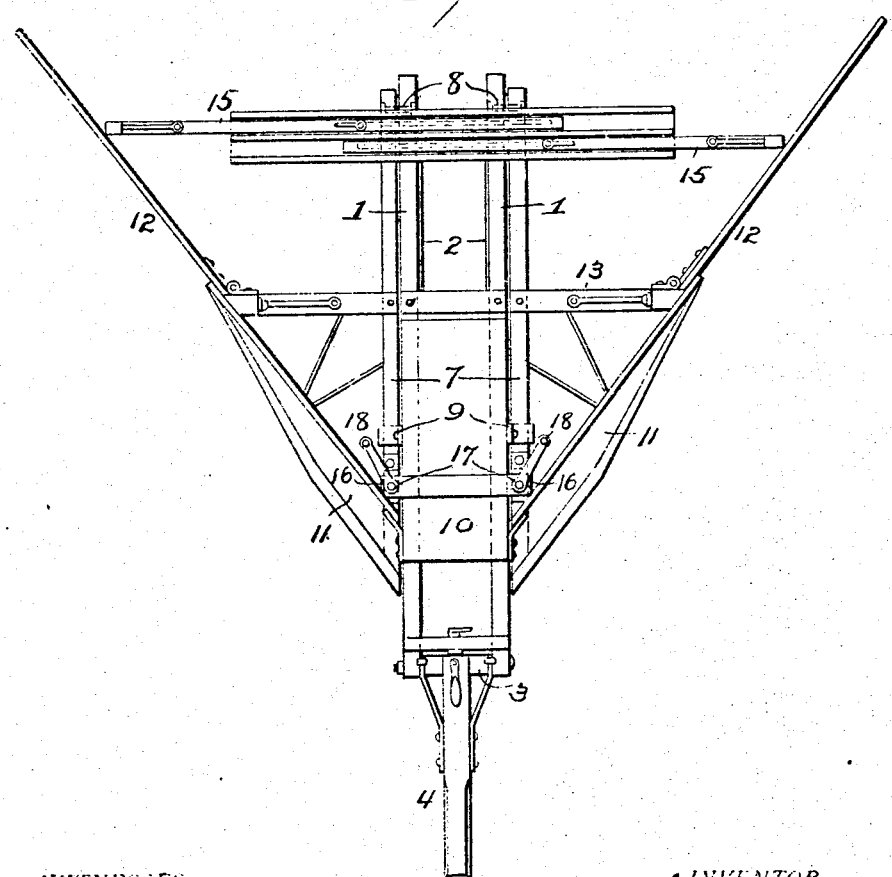
WITNESSES
E. I. Nottingham
G. F. Downing
INVENTOR
H. Grimes
By H. A. Seymour
Attorney

UNITED STATES PATENT OFFICE.

HOWARD GRIMES, OF NEWCOMB, NEW YORK.

SNOW-PLOW.

No. 803,821.     Specification of Letters Patent.     Patented Nov. 7, 1905.

Application filed April 28, 1905. Serial No. 257,908.

*To all whom it may concern:*

Be it known that I, HOWARD GRIMES, a resident of Newcomb, in the county of Essex and State of New York, have invented certain new and useful Improvements in Snow-Plows; and I do hereby declare the following to be a full, clear, and exact description of the invention, such as will enable others skilled in the art to which it appertains to make and use the same.

My invention relates to improvements in snow-plows, and more particularly to improvements upon the construction disclosed in Patent No. 751,183, granted February 2, 1904, to Stephen D. Lamos, the object of the invention being to provide improved mounting for the plows which permits their ready adjustment up and down; and the invention consists in certain novel features of construction and combinations and arrangements of parts, as will be more fully hereinafter described, and pointed out in the claims.

In the accompanying drawings, Figure 1 is a view in side elevation illustrating my improvements, and Fig. 2 is a top plan view.

1 1 represent long parallel runners having depending guide-plates 2 and connected at their forward ends by a rod 3, to which the sled-tongue 4 is secured, and a scraper or plow 5 is secured to a frame 6 between the forward end of runners 1 1 by a bolt and set-nut to lock the scraper or plow in any position of vertical adjustment, and thereby secure it in operation or not, as desired.

Auxiliary runners 7 7 are pivoted at their rear ends to main runners 1 1 by bolts 8, and depending tongues 9 are secured to a frame or box 10 on the main runners, and these tongues project down beside auxiliary runners 7 7 and serve as guides therefor, preventing any lateral deflection thereof.

Plows 11 are secured to the forward ends of these auxiliary runners 7 7 and with the aid of pivoted wings 12 at the rear ends of the plows serve to carry the snow to the sides. These wings 12 are pivotally supported on a cross-bar 13 and are held at any angle by means of adjustable cross-bars 15, as more clearly pointed out in the Lamos patent above referred to.

Supported to turn in internally-screw-threaded sleeves 16 at the sides of frame 10 are vertical screws 17, which latter are connected at their lower ends to the auxiliary runners 7, and crank-handles 18 are secured on the upper ends of these screws 17 to facilitate their adjustment. By turning these screws 17 in one direction the auxiliary runners 7 7 and plows 11, carried thereby, will be elevated out of contact with the ground, and the sled can run on its main runners 1 1 and be moved from place to place without the operation of the plows. When the plows are desired, the screws 17 are turned in the opposite direction, forcing down the forward ends of the auxiliary runners and moving the plows to operative position, and by means of these screws the plows can be adjusted up and down to any position desired with but slight exertion on the part of the operator.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a sled, of auxiliary runners connected therewith, means for adjusting said auxiliary runners up and down, and plows secured to and movable with said auxiliary runners.

2. The combination with a sled, of auxiliary runners pivoted at their rear ends to the sled, plows secured to the forward ends of the auxiliary runners, and means for adjusting said auxiliary runners up and down.

3. The combination with a sled, of auxiliary runners pivoted at their rear ends to the sled, plows carried by the forward ends of the auxiliary runners, a frame on the sled, means on said frame for guiding the auxiliary runners, and means on the frame for moving the auxiliary runners vertically.

4. The combination with a sled, of auxiliary runners pivoted at their rear ends to the sled, plows carried by the forward ends of the auxiliary runners, a frame on the sled, overhanging tongues secured to the frame and guiding vertical movement of the auxiliary runners, and screws supported by the frame and constructed to adjust the auxiliary runners and plows vertically.

5. In a snow-plow, the combination with a sled and a front scraper carried thereby, of auxiliary runners located at the sides of the sled and pivoted at their rear ends thereto, plows secured to the forward ends of the auxiliary runners and movable with the latter, a frame on the sled, and adjusting-screws carried by the frame and connected with the auxiliary runners.

6. In a snow-plow, the combination with a sled, and a front scraper carried thereby, of auxiliary runners located at the sides of the sled and pivotally secured at their rear ends thereto, plows secured to the forward ends of the auxiliary runners and movable therewith, a frame on the sled, screws mounted on the sides of the frame and connected at their lower ends to the auxiliary runners, crank-arms on the upper ends of the screws, and wings carried by the sled at the rear ends of the plows.

In testimony whereof I have signed this specification in the presence of two subscribing witnesses.

HOWARD GRIMES.

Witnesses:
 JOHN ANDERSON, Jr.,
 P. J. TUMMINS.